J. E. HODGES.
DEVICE FOR APPLYING STUCCO.
APPLICATION FILED MAR. 15, 1919.
Reissued Sept. 9, 1919.
14,721.
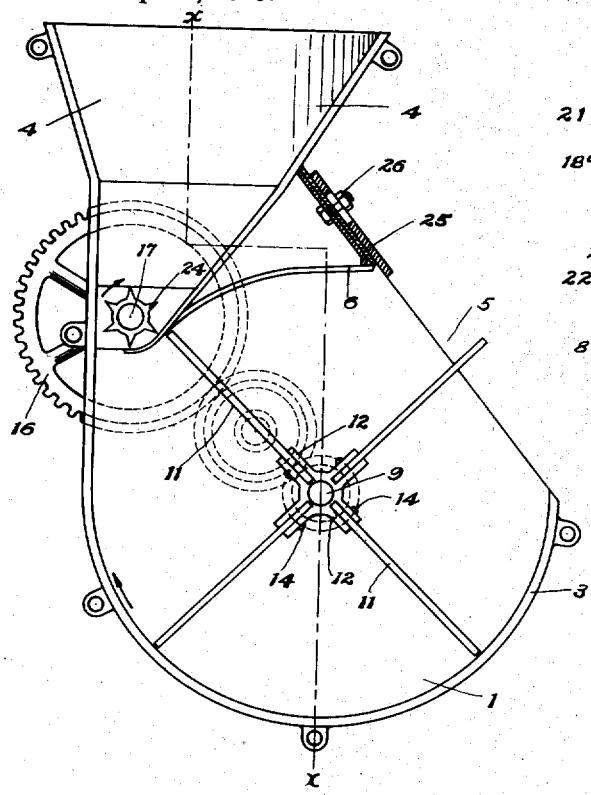
Fig. 1.
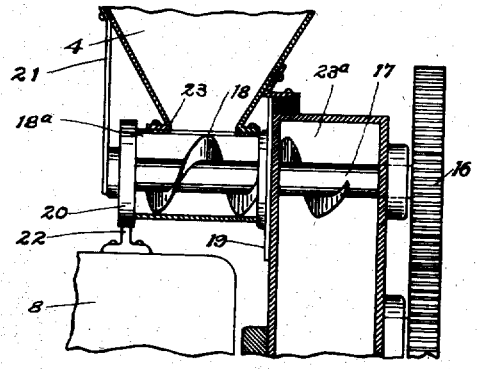
Fig. 3.
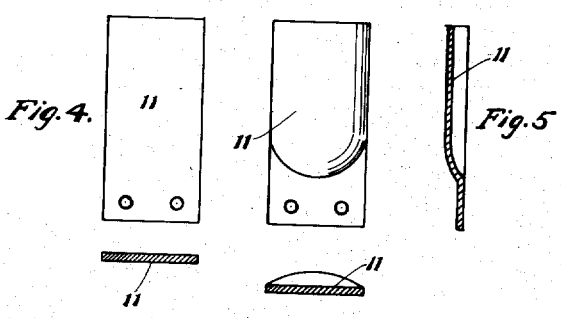
Fig. 4.
Fig. 5
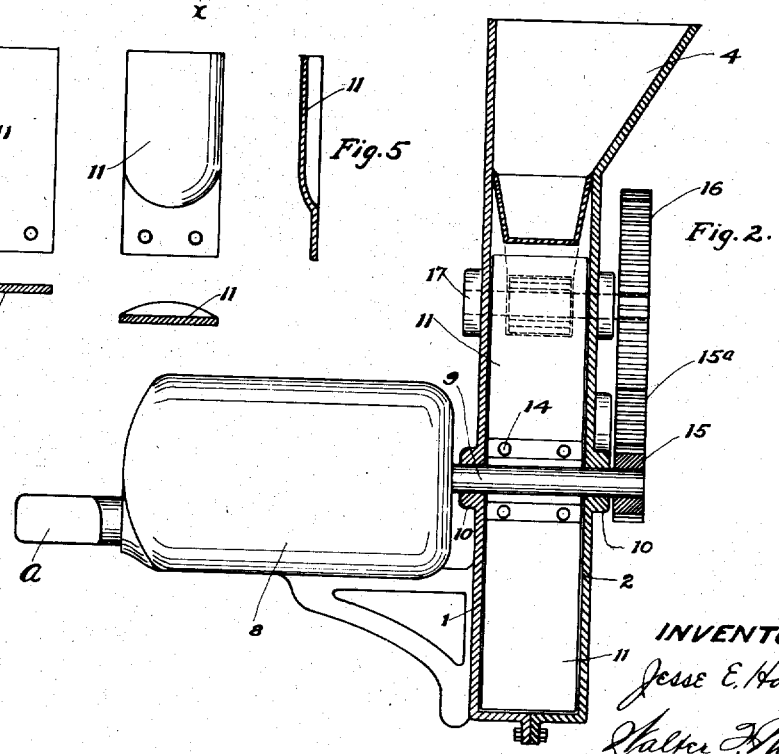
Fig. 2.
INVENTOR:
Jesse E. Hodges
Walter F. Murray
Atty.

UNITED STATES PATENT OFFICE.

JESSE E. HODGES, OF CINCINNATI, OHIO.

DEVICE FOR APPLYING STUCCO.

14,721. Specification of Reissued Letters Patent. Reissued Sept. 9, 1919.

Original No. 1,264,647, dated April 30, 1918, Serial No. 206,513, filed December 10, 1917. Application for reissue filed March 15, 1919. Serial No. 282,926.

*To all whom it may concern:*

Be it known that I, JESSE E. HODGES, a citizen of the United States of America, and a resident of Cincinnati, in the county of Hamilton, State of Ohio, have invented certain new and useful Improvements in Devices for Applying Stucco, of which the following is a full, clear, and exact description, reference being had to the accompanying drawing, forming part of this specification.

My invention relates to devices which may be employed for spreading stucco finish on walls of building structures and the like.

I am familiar with "guns" which are used for the purpose of applying stucco, and also with brush devices for this purpose, but in practice I have never found that these machines gave satisfactory results.

In my invention herein, the stucco is thrown against the surface to be treated by centrifugal force, and I employ a whirling spider to throw the material. I have found that it is requisite to feed the material to the spider in regular quantities, preferably proportionate to the speed of the spider. I have also found by much experimenting that at a certain point slightly past the vertical position of each spider arm is the best point from which to permit the stucco to fly off, and accordingly I incase my spider with a drum which is open only at the point from which the stucco material is to issue during operation of the spider.

It is also my object to provide a simple machine embodying the above structural principles, which may be used on some sort of movable support when large, or when small can be made portable, wherefore I provide preferably an electric motor operator for the device.

The above objects, and the advantages resulting therefrom, are accomplished by that certain construction and arrangement of parts more particularly pointed out below, and the novelty of the invention will be duly set forth in the appended claims.

In the drawings,

Figure 1, is a central vertical section of my apparatus.

Fig. 2, is a similar section at right angles to the section in Fig. 1, taken on the lines *x—x* of Fig. 1.

Fig. 3, is a vertical section of a portion of the apparatus illustrating a modified form of feed device.

Figs. 4 and 5, are plan and sectional views of two forms of the radial blades.

The casing of the device comprises a circular drum having heads 1, 2, and a rim 3. At the upper end of the drum is formed a hopper 4, which leads down into the drum at the side thereof, opposite the delivery orifice. This hopper may be formed by extending up the heads of the drum and running the rim of the drum up the back. This is not material, however. The drum has a delivery orifice 5, set between the vertical and horizontal lines of the drum when in operating position. This orifice 5, extends about to the horizontal line of the drum, but does not extend to the vertical thereof, and it is made by removing a section, not only of the rim of the drum but also of the heads. Preferably the rim is bent at the upper end of the orifice, as at 6, so as to be directed approximately horizontally, and if the heads of the drum are extended to form the hopper walls, this portion of the rim 3, is located inside of the structure, and is formed of a separate piece of metal.

Mounted on a suitable bracket 7, on one of the heads of the drum, is an electric motor 8, although a pneumatic or other type of motor might serve as well, since the source of power has no direct relation to my invention. The rotor shaft 9, of the motor extends through the drum, the heads being provided with suitable journals 10, 10, for this purpose.

The spider within the drum is mounted on the rotor shaft and comprises in my preferred form a set of radial blades 11, of some desired shape dependent upon the style of work that is to be done. If desired, the blades could be scooped, as in Fig. 5, and I prefer to make them of metal which has some resiliency so as to give more of a fling to the stucco material. I prefer also that these blades extend substantially to the periphery of the drum.

In order to provide a convenient means for mounting the blades on the rotor shaft whereby they can be dismounted when desired and replaced with other blades, I employ four angle plates 12, of suitably heavy metal, which plates are bolted through the shaft by means of bolts 13. The plates are inserted between the wings of the plates, and suitable bolts 14, passing through the two adjacent wings and the plates serve to hold the spider tightly and securely together and on the shaft.

The rotor shaft of the motor extends out through the drum on the side opposite the motor and is provided with a gear 15, which meshes through the idler 15ª, with a gear 16, mounted on a shaft 17. The shaft 17, is journaled in the delivery end of the hopper and is revolved by the motor through the gears 15, and 16, and 15ª.

On the shaft 17, is mounted a conveyer, which may be in one of several forms, either of which limits the amount of material which may pass through the hopper into the spider drum. The more expensive form comprises a conveyer worm 18, formed as part of the shaft 17. In such cases the hopper will be made so as to bolt onto a cylindrical casing 18ª, that is secured to the machine by means of a head 19, mounted on the drum head, and a head 20, secured by means of an arm 21, to the hopper case and by an arm 22, to the motor casing. The cylindrical casing 18ª, will be cut away at the top and the hopper casing brought down around the sides of said opening, as at 23. The worm 18, will extend through the cylindrical casing and through the extension 23ª on the hopper.

In another form, the conveyer will be made in the shape of a channeled roll 24, being part of the shaft 17. In this instance, which permits of the simple structure of the casing shown in Figs. 1 and 2, the forward wall of the hopper and the rim of the drum are made up of pieces of metal inserted inside of the casing. The roll 24, will be in the mouth of the hopper and there will be no reason for an extension of the side of the drum to permit of the conveyer passing through the drum itself, since the roll lies entirely within the delivery mouth of the hopper and does not interfere with the blades of the spider.

In both instances, the feed of material is between the blades of the spider on their upward stroke, and is regulated as desired by means of the gearing between the rotor shaft and the conveyer shafts.

The operation of the device is as follows:—The motor is started and stucco material placed in the hopper. The motor will spin the spider very rapidly and the conveyer will feed regular amounts of the material into the space between each spider blade. This material will be thrown off by centrifugal force through the nozzle or orifice in the drum, and by moving the machine along a wall, an even, well placed coat of the stucco can be laid.

The apparatus will of course vary in size for the requirements. When large it may be mounted on a track to slide back and forth, but ordinarily it can be manipulated by hand and for that purpose I provide the handle A, for the motor casing.

It will also be obvious that the apparatus can be used horizontally as well as vertically, by changing the position of the hopper.

I believe that this machine will operate well as a sand blast wall cleaner, wherein the sand is blasted against a wall and cleans it off. Because of the centrifugal flinging off of the stucco or sand material in the nozzle arranged as shown, said material being fed regularly to the spider, an efficient spreading machine is provided. The resiliency of the blades is a valuable feature, but I do not consider it essential.

In some cases it is desirable to mount a sliding gate 25, above the orifice in the drum, so as to allow an adjustment within somewhat restricted limits. This gate or abutment when extended over the orifice will strike the ends of the blades of the spider and cause the metal thereof to bend and spring back, thereby giving a further fling to the material and adding to the centrifugal force. Such a gate would be held in position as desired, a clamping screw 26 being shown engaging in a suitable slot in the gate 25.

Having thus described my invention, what I claim as new and desire to secure by Letters Patent is:—

1. A device of the character and for the purpose described, comprising in combination a revolving spider having interspaced arms, a casing for said spider having an outlet opening positioned just beyond the vertical plane and above the horizontal plane through the axis of said spider, a hopper located above the casing, and a conveyer between the hopper and the spider casing.

2. A device of the character described comprising a casing, a revolving member within the casing having interspaced blades, a hopper for material to be used located above the casing and an outlet for the hopper into the casing positioned above the horizontal plane and to one side of the vertical plane through the axis of said spider so as to feed material into the space between the blades on their upward stroke, and an outlet orifice or nozzle for the casing positioned to permit the material between the blades to be discharged just at the beginning of the downward stroke.

3. A device of the character described, comprising a casing, a revolving member within the casing having interspaced blades, a hopper for material to be used located above the casing and an outlet for the hopper into the casing positioned above the horizontal plane and to one side of the vertical plane through the axis of said spider so as to feed material into the space between the blades on their upward stroke, and an outlet orifice or nozzle for the casing positioned to permit the material between the blades to be discharged just at the beginning of the downward stroke, said hopper having means for controlling the amount of material passing through the outlet thereof, comprising a conveyer member adapted to feed a regulated amount of material through said outlet.

4. A device of the character described, comprising a casing, a revolving member within the casing having interspaced blades, a hopper for material to be used located above the casing, and an outlet for the hopper into the casing positioned above the horizontal plane and to one side of the vertical plane through the axis of said spider so as to feed material into the space between the blades on their upward stroke, and an outlet orifice or nozzle for the casing positioned to permit the material between the blades to be discharged just at the beginning of the downward stroke, said hopper having means for controlling the amount of material passing through the outlet thereof, comprising a conveyer member adapted to feed a regulated amount of material through said outlet, said conveyer and said revolving bladed member having a common operating member.

5. A device of the character described, comprising a cylindrical drum, a revoluble shaft therein, a plurality of blade elements extending radially from the shaft approximately to the rim of the drum, a hopper on the drum to feed material in between the blades, and a discharge orifice for the drum located beyond a vertical plane through the axis of the revoluble shaft.

6. A device of the character and for the purpose described, comprising in combination a revolving spider having interspaced arms, and a casing for said hopper having an outlet opening positioned just beyond the vertical plane and above the horizontal plane through the axis of said spider, a hopper located above the casing, and an adjustable abutment adapted to extend over said outlet to contact with the arms of the spider.

7. A device for applying stucco, comprising a casing having a discharge opening therein, a hopper adapted to hold the stucco and mounted upon and communicating with the casing, a motor mounted upon the casing, a spider mounted within the casing, a feeder mounted within the hopper and means for connecting the motor with the feeder and with the spider, and adapted to rotate the former at a slower speed than the latter, whereby the stucco is delivered from the device in a thin and uniform stream.

8. A device for applying stucco, comprising a casing, a motor mounted upon the casing and with its shaft extending through the walls of the casing, blades within the casing and secured to the shaft, a hopper adapted to hold stucco and mounted upon and communicating with the casing, a feeder in the casing adapted to feed material from the hopper to the blades and gearing connecting the shaft and the feeder and adapted to rotate the feeder at a speed less than that of the spider whereby the stucco is delivered from the device in a thin and uniform stream.

9. A device for applying stucco, comprising a casing, a hopper adapted to hold stucco and mounted upon and communicating with the casing, a feeder mounted within the hopper and adapted to feed material therefrom into the casing, a spider in the casing, a drive shaft for the spider and means for conveying rotation at a reduced speed from the drive shaft to the feeder whereby the stucco is delivered from the device in a thin and uniform stream.

In testimony whereof, I have hereunto subscribed my name this 21st day of February, 1919.

JESSE E. HODGES.